(No Model.)

J. W. HOLLINGSWORTH.
CUFF HASP.

No. 351,773. Patented Nov. 2, 1886.

Witnesses:
W. H. Masser
M. W. Hollingworth

Inventor:
John W. Hollingsworth

UNITED STATES PATENT OFFICE.

JOHN W. HOLLINGSWORTH, OF LOS ANGELES, CALIFORNIA.

CUFF-HASP.

SPECIFICATION forming part of Letters Patent No. 351,773, dated November 2, 1886.

Application filed March 20, 1886. Serial No. 196,017. (No model.)

*To all whom it may concern:*

Be it known that I, JOHN W. HOLLINGSWORTH, of Los Angeles, California, have invented a Cuff-Hasp, of which the following is a specification.

My invention consists of a hinged hasp for the purpose of fastening cuffs, as shown forth in the accompanying drawings and specifications.

The object of my invention is a fastening for cuffs that is strong, easy of application, sure to hold fast, and that cannot be easily lost out of the cuff to which it is attached.

Figure 1:
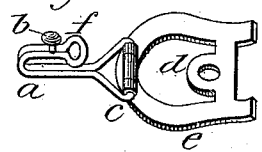
Figure 2:
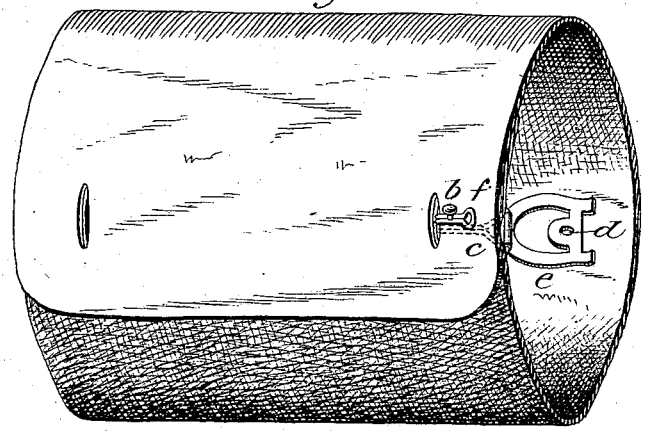
Figure 3:
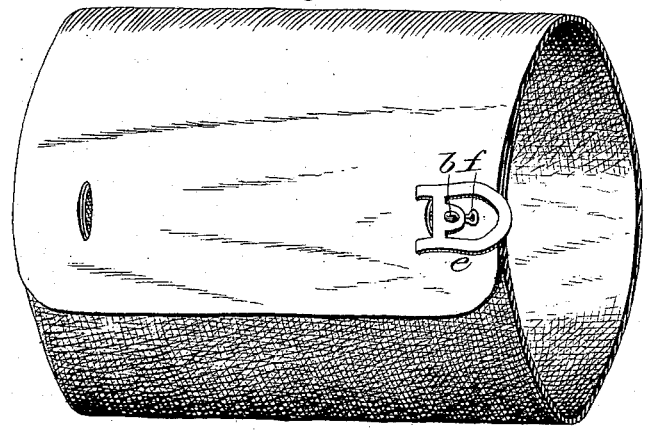

Figure 1 of the annexed drawings illustrates my cuff-hasp as open and unlocked. Fig. 2 shows the hasp as introduced into the button-hole of the cuff, but not locked. Fig. 3 represents the hasp as locked on the cuff and used.

My cuff-hasp is formed of two principal parts—the face-plate $e$ and hook $a$, which are hinged together at $c$, as shown in Fig. 1.

To mount the hasp upon the cuff, insert the knuckle of the hook $a$ from the inside of the cuff up through the button-hole, turning the knuckle of the hook so as to admit of a free passage of the lock-knob $b$ through the button-hole, and when the lock-knob appears above the surface of the cuff turn the hook again, so as to admit of a further free passage through the button-hole of the loop $f$. Then the hasp may be pulled forward until it assumes the position shown in Fig. 2. The face-plate $e$ may then be turned over the edge of the cuff, and the lock-knob $b$ sprung forcibly through the lock-loop $d$, and all be firmly secured, as shown in Fig. 3.

Some of the more practical merits that this invention possesses are, that the loop $f$ and the lock-knob $b$ are situated and arranged so that it is quite impossible for the hasp to lose out of the cuff, for its detachment from the cuff requires a careful inverse of the manner by which it was introduced. Furthermore, if by any means the hasp should become unlocked, it could not escape from the cuff without swinging in against the wrist, and thereby warning the wearer of its condition, and as it embraces the edge of the cuff it is much less liable to catch upon objects with which it may come in contact.

I am aware that the form of the horseshoe as shown in the face-plate $e$ of this hasp was in use prior to my invention. I therefore do not claim that specific form of face-plate; but What I do claim as my invention, and desire to secure by Letters Patent, is—

In a cuff hasp or holder, the combination, with hook $a$, provided with a locking-knob, $b$, and loop $f$, of a face-piece hinged to said hook and provided with an aperture, $d$, to co-operate with the locking-knob, substantially as set forth.

JOHN W. HOLLINGSWORTH.

Witnesses:
W. H. MASSER,
MERRILL W. HOLLINGSWORTH.